United States Patent
Arteaga et al.

(10) Patent No.: US 9,838,504 B2
(45) Date of Patent: *Dec. 5, 2017

(54) DYNAMIC NETWORK TRAFFIC MANAGEMENT IN RESPONSE TO NON-NETWORK CONDITIONS INPUT

(71) Applicant: International Business Machines Corporation, Armonk, NY (US)

(72) Inventors: Carlos M. Arteaga, San Antonio, TX (US); B. Stephen Currie, Harleysville, PA (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/753,171

(22) Filed: Jun. 29, 2015

(65) Prior Publication Data
US 2015/0304453 A1  Oct. 22, 2015

Related U.S. Application Data

(63) Continuation of application No. 13/687,064, filed on Nov. 28, 2012, now Pat. No. 9,100,321.

(51) Int. Cl.
*H04L 29/08* (2006.01)
*H04L 12/801* (2013.01)
(Continued)

(52) U.S. Cl.
CPC ............ *H04L 67/322* (2013.01); *H04L 47/14* (2013.01); *H04L 47/20* (2013.01);
(Continued)

(58) Field of Classification Search
CPC ... H04L 47/14; H04L 47/824; H04L 47/2408; H04L 47/783; H04L 47/822;
(Continued)

(56) References Cited

U.S. PATENT DOCUMENTS 6,775,280 B1 * 8/2004 Ma .................... H04L 45/00
370/230
7,733,891 B2   6/2010 Reynolds et al.
(Continued)

OTHER PUBLICATIONS

U.S. Appl. No. No. 13/687,064, filed Nov. 28, 2012.
Notice of Allowance (dated Mar. 25, 2015) for U.S. Appl. No. 13/687,064, filed Nov. 28, 2012.

*Primary Examiner* — Kwang B Yao
*Assistant Examiner* — Ricardo Castaneyra
(74) *Attorney, Agent, or Firm* — Patrick J. Daugherty; Driggs, Hogg, Daugherty & Del Zoppo Co., LPA (57) ABSTRACT

An appropriate quality of service policy is automatically selected as a function of network and business conditions. A current loading condition of an internet protocol network of devices operating, a current condition of radio frequency communications between wireless devices, and a current business condition that indicates a cost or availability of a resource used in device operation remotely controlled via data packet communications, are each determined under current network control and routing rules. If the resource cost or availability exceeds a specified market condition constraint, a special resource control rule is automatically selected to preempt a current network or routing rule to cause one or more of the internet protocol devices to reduce an amount of the resource used or distributed by the first internet protocol device while operating within the current determined internet protocol network loading and radio frequency communications conditions.

19 Claims, 3 Drawing Sheets

(51) Int. Cl.
    *H04L 12/813*     (2013.01)
    *H04L 12/851*     (2013.01)
    *H04L 12/927*     (2013.01)
    *H04L 12/911*     (2013.01)

(52) U.S. Cl.
    CPC ........ *H04L 47/2408* (2013.01); *H04L 47/783* (2013.01); *H04L 47/805* (2013.01); *H04L 47/824* (2013.01)

(58) Field of Classification Search
    CPC ..... H04L 47/805; H04L 47/20; H04L 67/322; H04L 41/5029; H04L 41/0896; H04W 48/06; H04W 28/0284; H04W 28/0247; H04W 28/0289; H04W 28/0268; H04W 36/14; H04W 4/26; H04W 24/02; H04W 24/00; H04W 24/08
    See application file for complete search history.

(56) References Cited

U.S. PATENT DOCUMENTS

| | | |
|---|---|---|
| 8,144,590 B2 | 3/2012 | Broberg et al. |
| 8,457,797 B2 | 6/2013 | Imes et al. |
| 8,605,619 B2 | 12/2013 | Vasseur |
| 2003/0086422 A1* | 5/2003 | Klinker .................. H04L 29/06 370/389 |
| 2006/0140115 A1 | 6/2006 | Timus et al. |
| 2008/0247314 A1 | 10/2008 | Kim et al. |
| 2009/0092062 A1 | 4/2009 | Koch et al. |
| 2010/0177633 A1 | 7/2010 | Bader et al. |
| 2012/0002541 A1 | 1/2012 | Lee et al. |
| 2012/0236713 A1 | 9/2012 | Kakadia et al. |

* cited by examiner

DYNAMIC NETWORK TRAFFIC MANAGEMENT IN RESPONSE TO NON-NETWORK CONDITIONS INPUT

FIELD OF THE INVENTION

The present invention relates to network technology. More specifically, the present invention relates to a dynamic network traffic management.

BACKGROUND

Computer system infrastructures may include large pluralities of networked servers, clients or programmable devices that exchange packet data or otherwise communicate with each other in providing services. Infrastructures often employ arbitration structures that mediate simultaneous competing requests by pluralities of devices to transmit packet data, signals or other electronic information through limited bandwidth switches and conduits. Device usage may be prioritized, for example through quality of service policies that prioritize certain users or data packets over others when resources cannot simultaneously serve both, wherein the lesser priority data/users may be held in a cache structure while priority users/data is handled, or they may be dropped.

However, while such quality of service policies may be efficient in effecting data-centric priorities, they are generally independent of and unresponsive to factors external to data management that may nonetheless be relevant to data transmission. Accordingly, a prior art quality of service policy that is robust under normal system operating conditions may fail to consistently utilize system resources in an efficient manner in distributing priority data packets under all operation conditions. This may result in a wide variety of system performance and cost outcomes in response to similar data inputs.

BRIEF SUMMARY

In one aspect of the present invention, a method automatically selects an appropriate quality of service policy as a function of network and business conditions. A current loading condition of an internet protocol network of devices operating, a current condition of radio frequency communications between wireless devices, and a current business condition that indicates a cost or availability of a resource used in device operation remotely controlled via data packet communications, are each determined under current network control and routing rules. A processing unit automatically selects a special resource control rule and preempts a current network or routing rule within the internet protocol network by the selected special resource control rule. The selected special resource control rule causes one or more of the internet protocol devices to reduce an amount of the resource used or distributed by the first internet protocol device while operating within the current determined internet protocol network loading and RF communications conditions, if the resource cost or availability exceeds a specified market condition constraint.

In another aspect, a system has a processing unit, computer readable memory and a tangible computer-readable storage medium with program instructions, wherein the processing unit, when executing the stored program instructions automatically selects an appropriate quality of service policy as a function of network and business conditions. A current loading condition of an internet protocol network of devices operating, a current condition of radio frequency communications between wireless devices, and a current business condition that indicates a cost or availability of a resource used in device operation remotely controlled via data packet communications, are each determined under current network control and routing rules. The processing unit automatically selects a special resource control rule and preempts one or both of the current network and current routing rules within the internet protocol network by the selected special resource control rule. The selected special resource control rule causes one or more of the internet protocol devices to reduce an amount of the resource used or distributed by the first internet protocol device while operating within the current determined internet protocol network loading and RF communications conditions, if the resource cost or availability exceeds a specified market condition constraint.

In another aspect, a computer program product has a tangible computer-readable storage medium with computer readable program code embodied therewith, the computer readable program code including instructions that, when executed by a computer processing unit, cause the computer processing unit to automatically select an appropriate quality of service policy as a function of network and business conditions. A current loading condition of an internet protocol network of devices operating, a current condition of radio frequency communications between wireless devices, and a current business condition that indicates a cost or availability of a resource used in device operation remotely controlled via data packet communications, are each determined under current network control and routing rules. The processing unit automatically selects a special resource control rule and preempts one or both of the current network and current routing rules within the internet protocol network by the selected special resource control rule. The selected special resource control rule causes one or more of the internet protocol devices to reduce an amount of the resource used or distributed by the first internet protocol device while operating within the current determined internet protocol network loading and RF communications conditions, if the resource cost or availability exceeds a specified market condition constraint.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
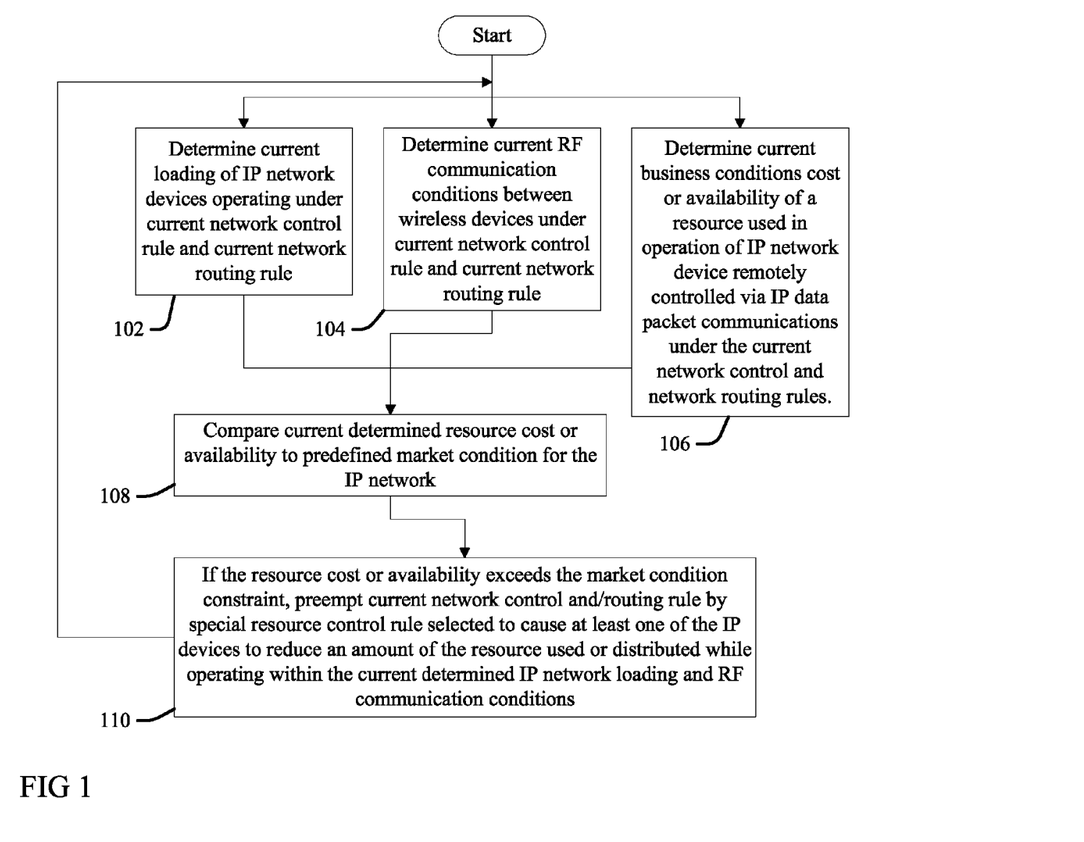
FIG. 1 is a block diagram illustration of a method or process for dynamically selecting an appropriate quality of service policy as a function of network and business conditions according to the present invention.

FIG. 1 illustrates an embodiment of a process or system according to the present invention that manages traffic in an internet protocol (IP) network by automatically and dynamically selecting an appropriate quality of service policy as a function of network and business conditions. More particularly, at 102 the current loading of an internet protocol (IP) network is determined, wherein the network includes a plurality of devices operating under a current network control rule and a current network routing rule. In some embodiments, establishing current loading includes determining the current latency of packets transmitted through the system devices, with increased times indicating that heavy traffic is causing buffering and perhaps dropping of low-priority packets. This is only a non-limiting example, and one skilled in the art will appreciate that still other techniques may be used by embodiments to determine current IP system loading.

At 104 the current condition of radio frequency (RF) communications between wireless devices of the plurality of devices under the current network control and network routing rules is determined. IP communication performance of the network as a whole may rely on or otherwise be impacted by the performance of a general RF network, or of individual radiofrequency devices, points or nodes thereof. Accordingly, RF conditions are monitored and assessed at 104, in part to determine whether expected or minimum quality of services are being achieved by the RF devices, the current network control and network routing rules.

At 106 current business conditions are observed that indicate or determine a cost or availability of a resource used in operation of one or more of the IP network devices remotely controlled via IP data packet communications under the current network control and network routing rules. A wide variety of resource costs and availabilities may be assessed at 106, wherein resource usage or movement or relative priority may be differentially allocated. In some embodiments, the business conditions contemplate current utility energy pricing or available generating capacity for powered devices under current network control. The powered devices may include computerized devices such as servers, routers, clients, as well as heating, ventilation and cooling (HVAC) systems or components. The resources considered may also include water, fuel, chemical or other commodities, such as those used or distributed by public utility or chemical production plants, and wherein the powered devices may include automated industrial control valves and gates that are controlled by IP network data. Business conditions may also contemplate pedestrian, vehicular and mass transit flow through public assemblies and roadway infrastructure, wherein the powered devices may be pedestrian and traffic signals deployed within mass transit right-of-ways, roadways and other public assembly areas.

At 108 the determined cost or availability of the resource is compared to a predefined market condition constraint of a plurality of predefined constraints for the IP network. At 110, if the resource cost or availability exceeds the market condition constraint, then one or both of the current network control and the current routing rule is preempted by a special resource control rule that is selected to cause at least one of the IP devices (for example, a first device) to reduce an amount of the resource used or distributed by the first IP device(s) while operating within the current determined IP network loading and RF communication conditions.

More particularly, the special resource control rule is chosen at 110 to reduce the use, distribution or allocation of the resource among the plurality of IP devices, while continuing to maintain minimum system performance as reflected by the current IP loading and RF performance context. This may include maintaining or improving some priority or critical IP traffic flows, or service to priority devices, at the expense of other lower-priority flows or devices. Thus, implementing the special resource control rule at 110 may cause lower-priority device flows to experience dropped packets or increased data buffering, or certain devices may be shut down for specified intervals.

The process iteratively repeats in a feedback loop that dynamically tunes subsequent network control or network routing rule preemptions and selections and associated IP device configuration adjustments at 110 in response to each pervious iteration of the steps and processes at 102, 104, 106 and 108. By reducing the total time needed for each iteration, dynamic tuning of IP device configurations may be achieved in a rapid fashion, in some examples in real-time, in response to each adjustment at 110.

Figure 2:
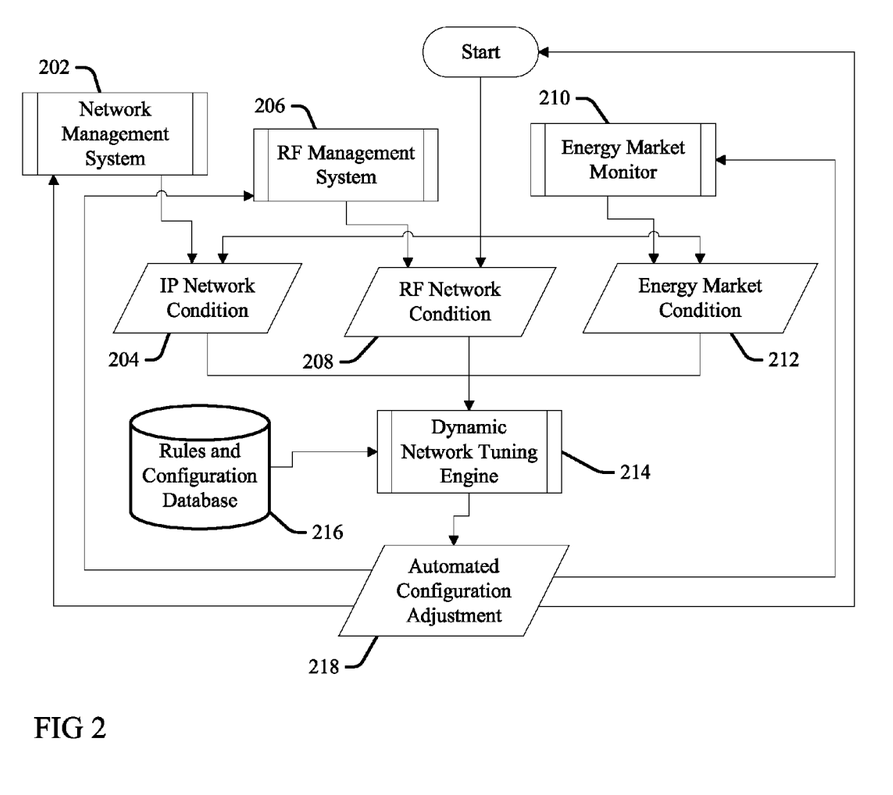
FIG. 2 is a block diagram illustration of an IT tool or infrastructure according to the present invention that manages traffic in an IP network by automatically and dynamically selecting an appropriate quality of service policy as a function of network and business conditions.

FIG. 2 illustrates an embodiment of an IT tool or infrastructure according to the present invention that manages traffic in an IP network by automatically and dynamically selecting an appropriate quality of service policy as a function of network and business conditions, as discussed above in FIG. 1. More particularly, a Network Management (Mgmt) System 202 determines the condition 204 of an IP network that includes a plurality of devices operating under a current network control rule and a current network routing rule, wherein the determined condition includes a current loading of packet traffic on the IP devices. An RF Management (Mgmt) System 206 determines the current condition 208 of radio frequency (RF) communications between wireless devices of the plurality of devices under the current network control and network routing rules. An Energy Market Monitor 210 determines the current energy market business conditions 212 that indicate or determine a cost or availability of a resource used in operation of one or more of the IP network devices remotely controlled via IP data packet communications under the current network control and network routing rules.

A Dynamic network tuning engine 214 receives as input the current IP network loading conditions 204, RF communication conditions 208 and energy market business conditions 212. If the energy market business conditions 212 resource cost or availability exceeds a market condition constraint that is predefined for the IP network and stored in or otherwise provided by a Rules and Configuration Database ("Base") 216, then one or both of the current network control and the current routing rule is preempted by a special resource control rule. The special resource control rule is selected in an automated configuration adjustment 218 to cause at least one of the IP devices to reduce an amount of the resource used or distributed while operating within the current determined IP network loading and RF communication conditions, and in compliance with any relevant predefined rules in the Rules and Configuration Base 216

The Dynamic network tuning engine 214 continually or iteratively tunes the automated configuration adjustment 218 in a feedback process that incorporates inputs from successive iterations of the current IP network loading condition 204, RF communication condition 208 and energy market business condition 212 observations, refining responsive rule preemptions and selections and device adjustments as necessary to comply with the predefined constraints provided by the Rules and Configuration Base 216.

The following provides an illustrative but not exhaustive example of a high-level algorithm applied to determine a rule preemption at 110 of FIG. 1, or by the Dynamic network tuning engine 214 of FIG. 2, to generate three different automated configuration adjustments (218) for three distinct and different observation business condition inputs, "market_condition1", "market_condition2" and "market_condition3":

```
While (act_on_market_condition1 or act_on_market_condition2 or
act_on_market_condition3 ...)
If market_condition1= true then
Preempt normal_network_control_rules while
act_on_market_condition1 = true
Enable special_control_rules1 on network_devices
Execute act_on_market_condition1
Execute Validate_Notify
Execute Reenact normal_network_control_rules
Execute Validate_Notify
Endif
If market_condition2 = true then
Suspend normal_network_control_rules while
act_on_market_condition2 = true
Enable special_control_rules2 on network_devices
Execute act_on_market_condition2
Execute Validate_Notify
Reenact normal_network_control_rules
Execute Validate_Notify
Endif
If market_condition3 = true then
Suspend normal_network_routing_rules while
act_on_market_condition3 = true
Enable special_control_rules3 on network_devices
Execute act_on_market_condition3
Execute Validate_Notify
Reenact normal_network_routing __rules
Execute Validate_Notify
Endif
.....
End
```

Thus, if the first "market_condition1" is observed, one or more "normal" network control rules are preempted by one or more "special control rules1" until a subsequent iteration determines that this condition is no longer observed, wherein the preemption of the "normal" network control rule(s) ends. Similarly, if the second "market_condition2" is observed, the "normal" network control rules are not preempted but are instead suspended while one or more "special control rules2" are enabled, until a subsequent iteration determines that the condition2 is no longer observed, wherein the suspension of the "normal" network control rule(s) ends. Lastly, if the third "market_condition3" is observed, one or more "normal" network routing rules are suspended and one or more "special control rules3" are enabled on some or all of the IP network devices until a subsequent iteration determines that this condition_3 is no longer observed, wherein the suspension of the "normal" network routing rule(s) ends.

It will be appreciated that the rule revisions associated with each of the observed business conditions need not be exclusive, but may be cumulative or achieved in combination with each other. For example, in one iteration, both "market_condition1" and "market_condition2" are observed, so that each of the preemption and rule suspensions indicated by exemplary algorithm are effected (at 110 of FIG. 1, or by the Dynamic network tuning engine 214 of FIG. 2), wherein in a subsequent iteration both "market_condition1" and "market_condition3" are instead observed and the rules suspended or enabled as indicated by the algorithm accordingly.

Prior art networks are generally unable to respond to external factors in a dynamic manner that meaningfully impacts network resource allocation. Traditional quality of service is generally based on static configurations that cannot adjust deterministically to external factors such as business market conditions or RF observations in very small windows of time. In contrast, embodiments of the present invention enable a network infrastructure to provide highly predictable network traffic flows to endpoints that control real-time, non-network latency-sensitive production systems.

In highly dynamic environments, such as within electric transmission or distribution utility systems where power demands may constantly change, internal factors such as an ability to generate sufficient power, and external factors such as market changes in power cost or end user power consumption rates and amounts, can each impact how the network and production system should be managed. Embodiments of the present invention provide for a highly agile system that can respond quickly to these changes and rapidly effect resource and cost savings while maintaining critical network communications and operations, via applying predefined constraints to the rule selection process (at 110 of FIG. 1, and at 218 of FIG. 2). Rather than select IP routing and control rules in response to IP network conditions as taught by the prior art, embodiments of the present invention enable business or market conditions to automatically drive IP routing and configuration revisions, to directly influence how the overall network behaves. Thus, the market may drive the IP network management domain from a data collection model to a command-and-control model, for some temporary period of time while the business conditions of concern are observed, until conditions return to normal and normal rules again apply.

Embodiments of the present invention achieve predictable end-to-end traffic flow capability throughout the network via a dynamic network tuning engine component that allocates data network resources real-time for critical application traffic flows based upon dynamic environment conditions. The dynamic network tuning engine component takes into account the statuses of all available resources that can service a particular traffic flow and then allocates resources for the critical flows based on predefined constraints and rules.

Endpoint connections may be mapped virtually and on-the-fly in response to business condition observations. For example, the three different rule preemptions in the exemplary high level algorithm described above may each establish new mappings between different groups of the IP devices, ensuring and enabling flows between different and certain endpoints without the need to connect them through a normal network condition. Some flows through other connections already existing may be dynamically preempted, interrupted, suppressed or put on hold during any given adjustment iteration in order to get priority traffic through another, special virtualized flow to a desired endpoint. In this fashion, the embodiments may virtually reroute packet data to only selected endpoints without having to reconfigure the system, and then quickly return to normal network distribution rules when normal business conditions return, wherein the entire interruption may last only seconds.

A variety of primary and additional external business factors may serve as inputs to the business condition determinations. For example, brownout conditions may be observed within an area providing energy to the IP devices, or predicted due to weather, energy supply disruption or other causes. In this case, a command may be sent out to the IP devices to reduce their energy usage, wherein this command will take priority over other configuration commands. Spot markets for energy and other resources may react rapidly to shortages or other disruptive inputs, resulting in quickly increasing or decreasing prices or other costs. Embodiments of the present invention enable users to quickly adapt and reduce resource use to avoid high costs, or to take advantage of lowering prices by increasing usage, in response to each cost fluctuation through the special rule selection iterations described above.

In some embodiments of the present invention, managed IP systems quickly recognize peak energy pricing contemporaneous with the actual energy usage and responsively require devices to back off on their own demand. This can quickly and effectively save significant amounts of money when large pluralities of devices are involved. By reducing the total time needed for each iteration of the processes of FIGS. 1 and 2, dynamic tuning of IP device configurations may be achieved in a rapid fashion, sometime in real-time in response to each adjustment at 110, which may thereby revise and maximize efficient resource allocations while still ensuring critical IP network communications at all times. This may provide significant resource savings in large scale IP networks including millions of energy or other resource-consuming devices. A preemption of seconds, up to only a few minutes, that causes millions of networked devices to temporarily shut down or use less resources can result in significant cost savings, perhaps millions of dollars, while being short enough that end users may not notice the short-term interruption of service necessitated by the temporary rule change. In one example, central heating systems may be cycled off for short periods of time during the winter, for example one half hour, and then cycled back on again. Such short term shut downs may not result in any noticeable amount of loss of heat or otherwise cause any discomfort to occupants within energy-efficient construction buildings or rooms or other zones served by these units, while saving significant energy costs to the provider.

The feedback loop structures of the embodiments of the present invention enable business conditions to be monitored for changes after each rule revision or preemption, etc. If things are getting worse, the process may recognize that prior revisions were not sufficient in size or scale and adjust further actions accordingly, for example making a larger change with the next iteration since the prior iteration at the smaller scale/scope was not as effective as expected, or will not give sufficient savings and resources and money due to the further deterioration of the market conditions. In some embodiments, the energy market monitor 210 learns appropriate responses to market conditions from its own prior history, considering as inputs what it last told the tuning engine 214 to do, what was actually executed through the dynamic tuning engine 214, and what was the resultant effect, in determining current market conditions 212 for input to the tuning engine 214 at the next iteration of constraint comparison.

Embodiments of the present invention also differentiate and distinguish IP and RF network condition observations to provide improved system tuning opportunities over prior art systems that fail to distinguish their conditions. While IP networks tend to be the backbone in an IT infrastructure and handle core communications, RF devices and protocols may be responsible for edge networks within the system that actually touch or interface with devices. IP structures generally provide different recovery characteristics, for example using buffering or other techniques that enable an IT system to throttle down data packet movement to adjust to given IP network conditions; they also generally have an ability to prioritize traffic so that certain traffic may be indicated as more important and prioritized over other traffic during congested periods or periods expressing high latency. In contrast, RF devices may be less reliable in effecting IP communications relative to hardwired devices, with no differentiated priority flows, or even dropping or losing certain data packets without buffering or saving them until transmissions are confirmed. They may also have different performance profiles; for example, their communications may not be IP-based, or they may use additional or different protocols for handling data or signals in combination with IP protocols, some of which may be unique or proprietary. Accordingly, embodiments of the present invention provide for improved network configuration tuning that accounts for reliability characteristics and communication protocols inherent with the use of the RF devices that are different from the reliability characteristics and communication protocols of other IP devices in the network. The embodiments thereby assure required quality of service when selecting appropriate preemption rules in response to each iteration of applying the business condition resource cost constraints.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
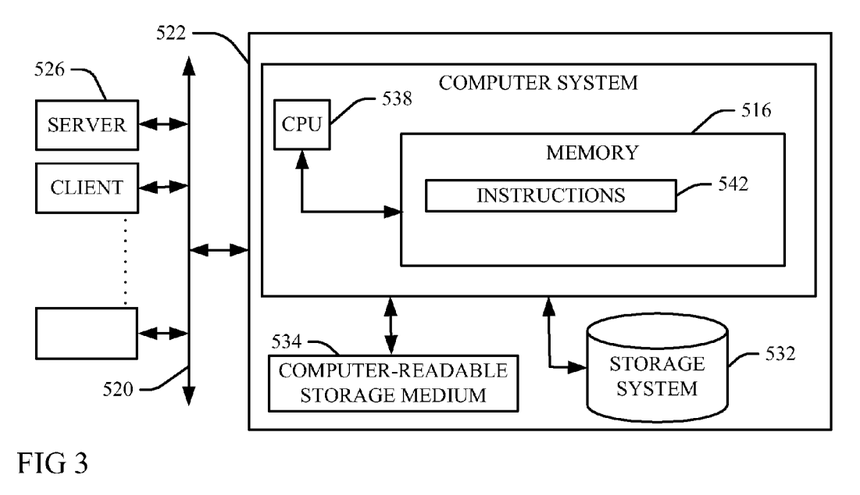
FIG. 3 is a block diagram illustration of a computer system implementation of an embodiment of the present invention.

Referring now to FIG. 3, an exemplary computerized implementation of an embodiment of the present invention includes a computer system or other programmable device 522 in communication with a plurality of IP infrastructure devices 526 (servers, clients, programmable devices, valves, switches, HVAC components, traffic signals, etc.) that manages data traffic in an internet protocol (IP) network by automatically and dynamically selecting an appropriate quality of service policy for the devices 526 as a function of network and business conditions as described above with respect to FIGS. 1 and 2. Instructions 542 reside within computer readable code in a computer readable memory 516, or in a computer readable storage system 532, or other tangible computer readable storage medium 534 that is accessed through a computer network infrastructure 520 by a Central Processing Unit (CPU) 538. Thus, the instructions, when implemented by the processing unit 538, cause the processing unit 538 to automatically and dynamically select an appropriate quality of service policy for the devices 526 as a function of network and business conditions as described above with respect to FIGS. 1 and 2.

Embodiments of the present invention may also perform process steps of the invention on a subscription, advertising, and/or fee basis. That is, a service provider could offer to integrate computer-readable program code into the computer system 522 to enable the computer system 522 to manage software levels of the information technology infrastructure components 526 as described above with respect to FIGS. 1-4. The service provider can create, maintain, and support, etc., a computer infrastructure such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for automatically selecting and applying a resource control rule as a function of an appropriate quality of service policy and network and business conditions, the method comprising executing on a central processing unit the steps of:

determining a current latency value for packets being transmitted through a plurality of devices of an internet protocol network operating under a current network control rule and a current network routing rule; and in response to determining that a cost of a resource used in operation of a first of the internet protocol network devices that is remotely controlled via internet protocol data packet communications under the current network control rule and the current network routing rule exceeds a specified market condition constraint, causing the first of the internet protocol devices to cycle off for a temporary period of time, and virtually mapping a new endpoint connection for data packet flow between second and third internet protocol devices of the plurality of internet protocol devices that reduces an amount of the resource used by the network of internet protocol devices while transmitting packets between the second and the third internet protocol devices at the determined current latency while meeting a quality of services policy.

2. The method of claim 1, further comprising:

integrating computer-readable program code into a computer system comprising the central processing unit, a computer readable memory and a computer readable hardware storage device, wherein the computer readable program code is embodied on the computer readable hardware storage device and comprises instructions for execution by the central processing unit via the computer readable memory that cause the central processing unit to perform the steps of determining the current latency value for the packets being transmitted through the plurality of devices of the internet protocol network operating under the current network control rule and the current network routing rule, and causing the first of the internet protocol devices to cycle off for the temporary period of time and virtually mapping the new endpoint connection for data packet flow between the second and the third internet protocol devices of the plurality of internet protocol devices that reduces the amount of the resource used by the network of internet protocol devices while transmitting packets between the second and the third internet protocol devices at the determined current latency while meeting the quality of services policy.

3. The method of claim 1, further comprising:

dynamically tuning configuration adjustments of the internet protocol network plurality of devices by repeating in a feedback loop the steps of determining the current latency value of packets being transmitted through the plurality of devices of the internet protocol network, causing the first of the internet protocol devices to cycle off for the temporary period of time, and virtually mapping each of new endpoint connections for data packet flow between the second and the third internet protocol devices of the plurality of internet protocol devices that reduce an amount of the resource used by the network of internet protocol devices while transmitting packets between the second and the third internet protocol devices at the determined current latency value while meeting the quality of services policy.

4. The method of claim 1, further comprising:

suppressing data packet flow through an existing endpoint connection between fourth and fifth internet protocol devices of the plurality of internet protocol devices, while causing the first of the internet protocol devices to cycle off for the temporary period of time, and virtually mapping the new endpoint connection for data packet flow between the second and the third internet protocol devices that reduces the amount of the resource used by the network of internet protocol devices while transmitting packets between the second and the third internet protocol devices at the determined current latency while meeting the quality of services policy.

5. The method of claim 4, further comprising:

in response to determining that the resource cost no longer exceeds the specified market condition constraint, ending the causing of the first protocol device to cycle off for the temporary period of time, the virtual mapping of the new endpoint connection for data packet flow between the second and the third internet protocol devices, and the suppressing the data packet flow through an existing endpoint connection between the fourth and the fifth internet protocol devices.

6. The method of claim 5, wherein the resource cost is a utility pricing or generating capacity with respect to electrical energy, water, fuel, or a chemical commodity.

7. The method of claim 6, further comprising:

the first of the internet protocol devices automatically cycling back on at an end of the temporary period of time.

8. A system that automatically selects and applies a resource control rule as a function of an appropriate quality of service policy and network and business conditions, the system comprising:

a central processing unit;

a computer readable memory in communication with the central processing unit; and a computer-readable hardware storage device in communication with the central processing unit;

wherein the central processing unit executes program instructions stored on the computer-readable hardware storage device via the computer readable memory and thereby:
determines a current latency value for packets being transmitted through a plurality of devices of an internet protocol network operating under a current network control rule and a current network routing rule; and
in response to determining that a cost of a resource used in operation of a first of the internet protocol network devices that is remotely controlled via internet protocol data packet communications under the current network control rule and the current network routing rule exceeds a specified market condition constraint, causes the first of the internet protocol devices to cycle off for a temporary period of time, and virtually maps a new endpoint connection for data packet flow between second and third internet protocol devices of the plurality of internet protocol devices that reduces an amount of the resource used by the network of internet protocol devices while transmitting packets between the second and the third internet protocol devices at the determined current latency while meeting a quality of services policy.

9. The system of claim 8, wherein the central processing unit executes the program instructions stored on the computer-readable hardware storage device via the computer readable memory, and thereby further dynamically tunes configuration adjustments of the internet protocol network plurality of devices by repeating in a feedback loop steps of determining the current latency value of packets being transmitted through the plurality of devices of the internet protocol network, causing the first of the internet protocol devices to cycle off for the temporary period of time, and virtually mapping each of new endpoint connections for data packet flow between the second and the third internet protocol devices of the plurality of internet protocol devices that reduce an amount of the resource used by the network of internet protocol devices while transmitting packets between the second and the third internet protocol devices at the determined current latency value while meeting the quality of services policy.

10. The system of claim 8, wherein the central processing unit executes the program instructions stored on the computer-readable hardware storage device via the computer readable memory, and thereby further suppresses data packet flow through an existing endpoint connection between fourth and fifth internet protocol devices of the plurality of internet protocol devices, while causing the first of the internet protocol devices to cycle off for the temporary period of time, and virtually maps the new endpoint connection for data packet flow between the second and the third internet protocol devices that reduces the amount of the resource used by the network of internet protocol devices while transmitting packets between the second and the third internet protocol devices at the determined current latency and meeting the quality of services policy.

11. The system of claim 10, wherein the central processing unit executes the program instructions stored on the computer-readable hardware storage device via the computer readable memory, and thereby further, in response to determining that the resource cost no longer exceeds the specified market condition constraint, ends the causing of the first protocol device to cycle off for the temporary period of time, ends the virtual mapping of the new endpoint connection for data packet flow between the second and the third internet protocol devices, and ends the suppressing of the data packet flow through an existing endpoint connection between the fourth and the fifth internet protocol devices.

12. The system of claim 11, wherein the resource cost is a utility pricing or generating capacity with respect to electrical energy, water, fuel, or a chemical commodity.

13. The system of claim 12, wherein the central processing unit executes the program instructions stored on the computer-readable hardware storage device via the computer readable memory, and thereby further automatically cycles the first of the internet protocol devices back on at an end of the temporary period of time.

14. A computer program product for automatically selecting and applying a resource control rule as a function of an appropriate quality of service policy and network and business conditions, the computer program product comprising:
a computer readable hardware storage device having computer readable program code embodied therewith, the computer readable program code comprising instructions for execution by a computer central processing unit that cause the computer central processing unit to:
determine a current latency value for packets being transmitted through a plurality of devices of an internet protocol network operating under a current network control rule and a current network routing rule; and
in response to determining that a cost of a resource used in operation of a first of the internet protocol network devices that is remotely controlled via internet protocol data packet communications under the current network control rule and the current network routing rule exceeds a specified market condition constraint, cause the first of the internet protocol devices to cycle off for a temporary period of time, and virtually map a new endpoint connection for data packet flow between second and third internet protocol devices of the plurality of internet protocol devices that reduces an amount of the resource used by the network of internet protocol devices while transmitting packets between the second and the third internet protocol devices at the determined current latency while meeting a quality of services policy.

15. The computer program product of claim 14, wherein the computer readable program code instructions for execution by the computer central processing unit further cause the computer central processing unit to dynamically tune configuration adjustments of the internet protocol network plurality of devices by repeating in a feedback loop steps of determining the current latency value of packets being transmitted through the plurality of devices of the internet protocol network, causing the first of the internet protocol devices to cycle off for the temporary period of time, and virtually mapping each of new endpoint connections for data packet flow between the second and the third internet protocol devices of the plurality of internet protocol devices that reduce an amount of the resource used by the network of internet protocol devices while transmitting packets between the second and the third internet protocol devices at the determined current latency value while meeting the quality of services policy.

16. The computer program product of claim 14, wherein the computer readable program code instructions for execution by the computer central processing unit further cause the computer central processing unit to suppress data packet flow through an existing endpoint connection between fourth and fifth internet protocol devices of the plurality of internet protocol devices, while causing the first of the internet protocol devices to cycle off for the temporary period of time, and virtually map the new endpoint connection for data packet flow between the second and the third internet protocol devices that reduces the amount of the resource used by the network of internet protocol devices while transmitting packets between the second and the third internet protocol devices at the determined current latency and meeting the quality of services policy.

17. The computer program product of claim 16, wherein the computer readable program code instructions for execution by the computer central processing unit further cause the computer central processing unit to, in response to determining that the resource cost no longer exceeds the specified market condition constraint, end the causing of the first protocol device to cycle off for the temporary period of time, end the virtual mapping of the new endpoint connection for data packet flow between the second and the third internet protocol devices, and end the suppressing of the data packet flow through an existing endpoint connection between the fourth and the fifth internet protocol devices.

18. The computer program product of claim 17, wherein the resource cost is a utility pricing or generating capacity with respect to electrical energy, water, fuel, or a chemical commodity.

19. The computer program product of claim 18, wherein the computer readable program code instructions for execution by the computer central processing unit further cause the computer central processing unit to automatically cycle the first of the internet protocol devices back on at an end of the temporary period of time.

\* \* \* \* \*